United States Patent [19]

Myers

[11] 4,083,329
[45] Apr. 11, 1978

[54] ROTARY ENGINE WITH A PILOT FUEL NOZZLE DOWNSTREAM OF TOP CENTER

[75] Inventor: David M. Myers, Upper Saddle River, N.J.

[73] Assignee: Curtiss-Wright Corporation, Wood-Ridge, N.J.

[21] Appl. No.: 768,142

[22] Filed: Feb. 14, 1977

[51] Int. Cl.² ............................................. F02B 53/10
[52] U.S. Cl. .................................... 123/205; 123/210; 123/218; 123/219
[58] Field of Search ..................... 123/8.09, 8.11, 8.13

[56] References Cited

U.S. PATENT DOCUMENTS

| 3,246,636 | 4/1966 | Bentele | 418/142 X |
| 3,894,518 | 7/1975 | Gavrun et al. | 123/32 ST X |
| 3,991,723 | 11/1976 | Myers | 123/8.09 |

*Primary Examiner*—Carlton R. Croyle
*Assistant Examiner*—Michael Koczo, Jr.
*Attorney, Agent, or Firm*—Victor D. Behn; Arthur Frederick

[57] ABSTRACT

A rotary engine having a pair of fuel injection nozzles disposed adjacent to and on opposite sides of a lobe junction of the rotor housing in the combustion region and a spark plug is disposed adjacent to the fuel nozzle which is disposed on the downstream side of said junction.

7 Claims, 5 Drawing Figures

ROTARY ENGINE WITH A PILOT FUEL NOZZLE DOWNSTREAM OF TOP CENTER

BACKGROUND OF INVENTION

The invention relates to rotary internal combustion engines of the type disclosed in prior U.S. Pat. No. 2,988,065 granted on June 13, 1961 to Wankel et al, and particularly to such an engine designed for operation as a stratified charge engine and employing two high pressure fuel injection nozzles, as disclosed in U.S. Pat. No. 3,894,518 granted on July 15, 1975 to Gavrun et al.

A stratified charge rotary engine, as disclosed in the aforementioned Gavrun et al patent, has been operated by applicant's assignee and has achieved a substantial improvement in fuel consumption and firing regularity over prior stratified charge rotary engines. This successful operation has been achieved with remarkably low quantities of carbon monoxide (CO), oxides of nitrogen ($NO_x$) in the engine exhaust. However, the quantity of hydrocarbons (HC) in the engine exhaust, although less than in prior stratified charge rotary engines, was still higher than desirable particularly in view of exhaust emission standards presently prescribed for the future.

SUMMARY OF THE INVENTION

In view of the foregoing, an object of this invention is to modify a rotary engine for the type shown in the Gavrun et al patent so as to reduce the quantity of HC in the engine exhaust.

The rotary engine disclosed in the Gavrun et al patent has two high pressure fuel injection nozzles, a first nozzle which is combined with a spark plug to provide a pilot flame for igniting fuel supplied through a second or main nozzle. In the configuration of the Gavrun et al patent, the pilot nozzle is disposed upstream of one of the lobe junctions of the multi-lobe inner surface of the rotor housing while the main fuel nozzle is disposed downstream of said lobe junction. Unless otherwise specified, all directions such as upstream or downstream are intended herein to be relative the direction of rotor rotation.

In contrast to the Gavrun et al arrangement, with the present invention the pilot fuel nozzle is disposed adjacent to and downstream of the lobe junction on the combustion side of multi-lobe housing surface and is oriented to direct its fuel spray in a generally upstream direction into each working chamber and the main fuel nozzle is disposed adjacent to but upstream of said lobe junction. This configuration has resulted in a substantial reduction in the HC exhaust emission from the engine during low power operation without any sacrifice in the CO or $NO_x$ emissions or in engine performance or fuel economy. This reduction in HC emissions at low engine powers is particularly important for passenger car engines. In fact, any reduction in the exhaust emissions of an engine without adversely affecting fuel economy is obviously important because of present day pollution and energy problems. Also, this result is quite significant because modifications of an engine to reduce one component of the exhaust emissions is usually accomplished at a sacrifice of other exhaust emissions and/or fuel economy.

The reduction in HC exhaust emission is considered, at least in part, attributable to the fact that the pilot nozzle fuel spray is directed at a small angle to the rotor surface thereby reducing direct impingement of the pilot fuel on the rotor. Furthermore, location of the pilot nozzle in a region adjacent to and downstream of the lobe junction on the combustion side of the multi-lobe surface of the rotor housing has resulted in further improvement in the firing regularity of the engine at low power. This improvement is attributed to the fact that this is a region of relatively high heat flow into the rotor housing as compared to the other side of this lobe junction thereby resulting in better vaporization of the pilot fuel.

It therefore is a further object of the invention to provide a rotary engine having a high-pressure pilot fuel injection nozzle located adjacent to and downstream of the lobe junction on the combustion side of the multi-lobe surface of the rotor housing with its fuel spray being directed in a generally upstream direction and also having a high-pressure main fuel injection nozzle located upstream of said lobe junction.

It is recognized that FIGS. 7 and 8 of U.S. Pat. No. 3,246,636 granted on Apr. 19, 1966 to Bentele, discloses a rotary engine having a fuel nozzle located downstream of the lobe junction on the combustion side of the multi-lobe surface of the rotor housing. This Bentele patent, however, has only one fuel nozzle so that all the fuel is supplied through its single nozzle. With the engine configuration of Bentele, applicant's assignee has experienced difficulty in operating the engine over the entire operating range with acceptable firing regularity and good engine performance. This difficulty was the stimulus for the pilot and main fuel nozzle feature of the aforementioned Gavrun et al patent and this dual nozzle feature is utilized in the present invention.

With the main fuel nozzle disposed upstream of the combustion side end of the lobe junction on the combustion side of the rotor housing surface, a major portion of its fuel is directed downstream toward the leading end of each working chamber. In order to provide better atomization of this fuel, the combustion recess or cavity in each working face of the rotor is located so that the trailing edge portion of each said cavity passes under, or at least, approaches the main fuel nozzle during fuel injection from the main nozzle into a working chamber. This location of the trailing edge of each combustion recess or cavity serves to accelerate the air flow in each working chamber in the vicinity of the main nozzle to increase atomization of this main fuel. Accordingly, as will be apparent, the combustion recess or cavity in each working face of the rotor should be disposed closer to the leading end of said face in order to so locate the trailing edge of each such combustion recess or cavity.

Therefore, it is still another object of the invention to provide a rotary engine with a high-pressure pilot fuel-injection nozzle on the downstream side of the lobe junction on the combustion side of the rotor housing multi-lobe surface and a high pressure main fuel injection nozzle on the upstream side of said lobe junction and with each working face of the rotor having a cavity therein disposed closer to the leading end of said face.

Other objects of the invention will be apparent when reading the following detailed description in connection with the drawings.

DESCRIPTION OF PREFERRED EMBODIMENTS

Figure 1:
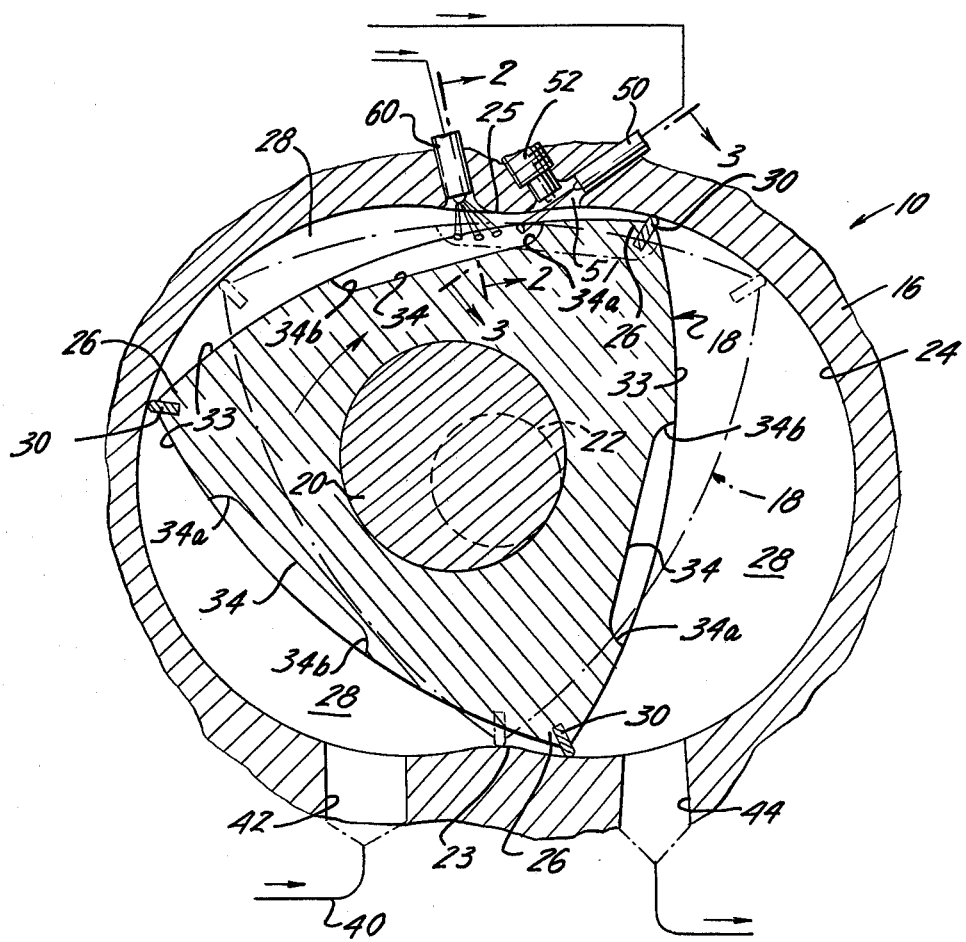
FIG. 1 is a schematic transverse sectional view of a rotary combustion engine embodying the invention.
Figure 2:
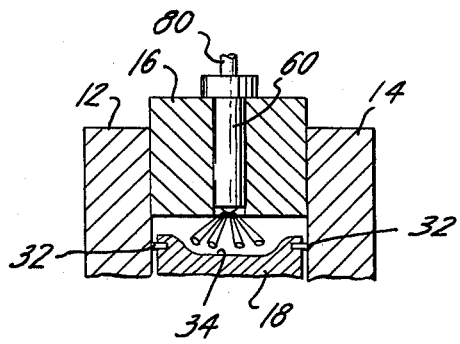
FIGS. 2 and 3 are sectional views taken along lines 2—2 and 3—3 respectively of FIG. 1.
Figure 3:
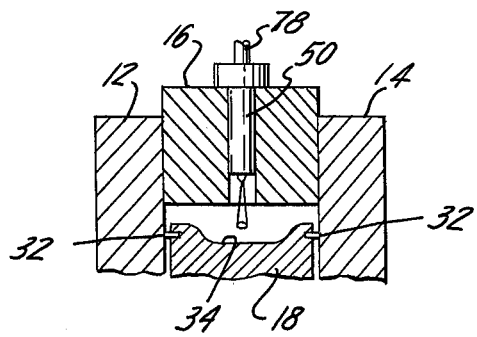
Figure 4:
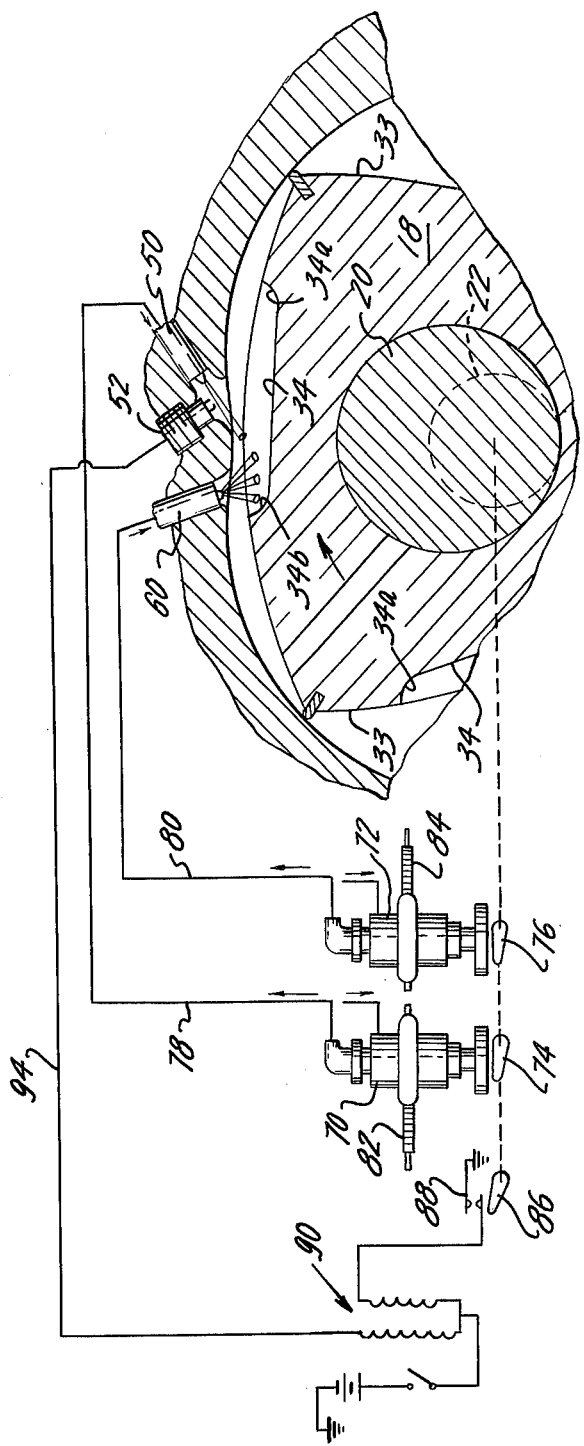
FIG. 4 is a diagrammatic view showing a portion of FIG. 1 and also showing the fuel control and ignition systems.

Referring to the drawing, particularly to FIGS. 1 to 3, a rotating combustion engine is schematically indicated at 10, the engine being generally similar to the type disclosed in said aforementioned prior patents. The engine 10 comprises an outer body or housing consisting of two axially spaced end housings 12 and 14 and an intermediate or rotor housing 16, the housings being secured together to form the engine cavity therebetween. An inner body or rotor 18 is journaled for rotation within said housing cavity on an eccentric portion 20 of a shaft 22 which extends coaxially through and is supported by bearings (not shown) in the end housings 12 and 14. The axis of the shaft 22 is perpendicular to the inner walls of the end housings 12 and 14.

The peripheral inner surface 24 of the intermediate housing 16 is illustrated as having a two-lobe profile which preferably is basically an epitrochoid, said two lobes joining at junctions 23 and 25. The rotor 18 has a generally triangular profile with apex portions 26 having sealing cooperation with the trochoidal surface 24 to form three engine working chambers 28 between the rotor and the housings 12, 14 and 16. For this purpose, each of the rotor apex portions is provided with a seal 30 which extends across the rotor between the inner walls of the end housings 12 and 14 and the rotor also has suitable seals 32 on its end faces for sealing contact with said end housing inner walls. Each of the three working faces 33 of the rotor preferably is provided with a trough-like recess 34 with each working face 33 extending from one apex seal 32 to an adjacent apex seal.

The engine 10 also includes suitable gearing (not illustrated) between the rotor 18 and the engine housing to control the relative rotation of the rotor, such gearing is conventional and preferably is similar to that illustrated in the aforementioned patent to Wankel et al.

An air intake passage 40 supplies air to an air intake port 42 disposed adjacent to and at one side of the junction 23 of the two lobes of the trochoidal peripheral surface 24. Said passage 40 extends through the intermediate housing 16 and the port 42 opens through the inner trochoidal surface 24 of intermediate housing 16. The air intake passage 40 preferably does not have any air throttle valve. An exhaust port 44 is formed in the intermediate housing 16 adjacent to and on the opposite side of said junction 23. The engine combustion is initiated in the engine working chambers 28 in the vicinity of the other junction 25 of the two lobes of trochoidal surface 24.

The engine structure so far described is conventional and is generally similar to that illustrated in the aforementioned prior patents. Reference is made to said prior patents for further details of such an engine including, for example, details of the rotor seals and the gearing between the rotor and housing. With such an engine, during engine operation and with the rotor rotating clockwise, as viewed in FIG. 1, the volume of each working chamber 28 periodically increases from a minimum volume condition, when it is located adjacent to the lobe junction 23 and opens the intake port 42, to a maximum volume condition and closes the intake port and then said chamber decreases in volume to compress its intake charge until the working chamber again reaches a minimum volume condition, but this time at the lobe junction 25. Thereafter the volume of said chamber again increases to a maximum and then decreases to a minimum as the chamber comes into communication with the exhaust port at lobe junction 23 to complete the cycle.

A first fuel nozzle 50 is mounted on the intermediate housing 16 adjacent to the lobe junction 25 and on the downstream side of said junction. The fuel nozzle 50 has its fuel discharge end disposed in a recess 51 opening to the trochoidal surface 24 for discharging fuel into each working chamber after the air-intake charge within the chamber has been substantially compressed and combustion is about to be initiated. A spark plug type igniter 52 is also mounted on the intermediate housing adjacent to the lobe junction 25 and adjacent to the nozzle 50. The electrodes of the spark plug 52 are disposed adjacent to the discharge end of the nozzle 50 preferably so that said nozzle discharge end and the spark plug electrodes both open through the trochoidal surface 24 through the same common recess 51. In addition, the fuel nozzle 50 and spark plug 52 preferably are disposed so that at least a portion of the fuel vapor produced by fuel spray discharged from the nozzle passes in close proximity to said spark plug electrodes immediately as the fuel leaves the nozzle 50 for ready ignition by said spark plug.

As in the aforementioned patent to Gavrun et al, the ignition circuit for the spark plug 52 is arranged to fire the spark plug while fuel is discharging from the nozzle 50 into a working chamber 28 so that a portion of this fuel is ignited at the fuel nozzle 50 as it discharges from the nozzle and the burning of this initial portion of the fuel discharged from the nozzle 50 ignites the balance of the fuel discharging from said nozzle. The timing of the spark from the spark plug 52 is such that it fires during the period of discharge from the nozzle 50 into a working chamber 28 and preferably during the initial period of such discharge into each working chamber 28.

A second fuel nozzle 60 is mounted on the intermediate housing 16 also adjacent to the lobe junction 25 but on the upstream side of said junction. As in the case of the nozzle 50, the second fuel nozzle 60 is arranged to initiate the discharge of its fuel into each working chamber 28 after the air charge in said chamber has been substantially compressed and combustion is about to be initiated in a timely manner relative to discharge of fuel from the nozzle 50. For example, at low engine loads discharge of fuel from the main nozzle 60 into each working chamber 28 may be initiated somewhat after fuel is discharged from the nozzle 50 whereas at high engine loads in order to provide time for fuel discharge from the main nozzle 60, the fuel discharge from this main nozzle can be initiated somewhat before fuel is discharged from the pilot nozzle 50. As a result, the combustion flame resulting from the ignition by the spark plug 52 of the fuel discharging from the first nozzle 50 into each working chamber 28 is effective to ignite the fuel discharged from the second nozzle 60 into said chamber. Thus, the burning fuel discharged by the nozzle 50 functions as a pilot flame to ignite the fuel discharged by the nozzle 60.

The nozzles 50 and 60 are supplied with fuel from positive displacement fuel pumps 70 and 72, respectively. Engine driven cams 74 and 76 are provided for activating the fuel pumps 70 and 72 for supplying a predetermined quantity of fuel to the fuel nozzles 50 and 60 through conduits 78 and 80, respectively, for discharge into each working chamber 28 each time a working chamber reaches a position (such as the upper chamber 28 in FIG. 1 with the rotor 18 in its full line position) just prior to the working chamber reaching full compression or top-dead-center position adjacent to the lobe junction 25. Each pump 70 and 72 includes means such as the linearly movable racks 82 and 84 respectively, for varying the effective strokes of the pumps so as to regulate the amount of fuel delivered to the nozzles 50 and 60. The power output of the engine is primarily controlled by regulating the supply of fuel to the main nozzle 60. An additional engine driven cam 86 is provided to operate the make-and-break contacts 88 of the ignition circuit 90 connected to the spark plug 52 by the wire 94.

The details of these ignition and fuel systems may be similar to that described in the aforementioned patent to Gavrun et al and the operation of the engine 10 is essentially similar to that described in said Gavrun et al patent. Hence, the engine 10 is operable on various types of fuels, including low octane types of fuel such as kerosene and diesel fuels as well as gasoline.

With the present invention, however, since the pilot fuel nozzle 50 discharges its fuel spray in a generally upstream direction, as shown in FIG. 1, the pilot fuel spray is directed at a small angle relative to the rotor working faces 33 throughout the period of fuel discharge from the pilot nozzle thereby minimizing impingement of pilot nozzle fuel on the rotor. Reduction of impingement of the pilot fuel on the working faces 33 of the rotor 18 is considered to be a major factor in the reduction in the HC exhaust emissions at low engine powers achieved with the present invention. This is considered to be so because the rotor working faces 33 have a relatively low temperature compared to the combustion temperatures and therefore any direct impingement of fuel on the rotor working faces tends to increase the formation of carbon deposits on said faces and to increase the HC exhaust emission from the engine.

Preferably, and as illustrated in the full line position of the rotor in FIG. 1, the leading edge 34a of each rotor recess 34 extends sufficiently close to the leading end of its working face 33 so that by the time fuel discharge from the pilot nozzle 50 is initiated, this initial pilot fuel is directed toward said recess and therefore at least a major portion of the pilot nozzle fuel discharged into each working chamber 28 is discharged toward the recess 34 of the rotor working face 33 associated with said chamber. In this way, direct impingement of the pilot nozzle fuel on the rotor is further minimized.

Figure 5:
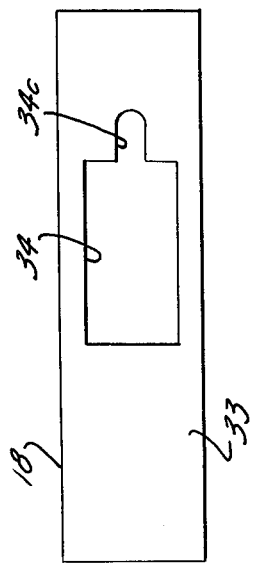
FIG. 5 is a plan view of a rotor face showing a modified rotor recess.

Instead of extending the entire width of the leading or downstream end of each rotor recess 34 sufficiently close to the leading end of its working face for receiving the fuel from the pilot nozzle 50, the leading or downstream end of each recess may be provided with a downstream extending notch 34c for this purpose as illustrated in FIG. 5. As there shown, the notch 34c is symmetrically spaced between the sides of the rotor. This arrangement of FIG. 5 has the advantage in that the notch 34c does not cause as much of a reduction in the engine compression ratio as would be the case if the entire width of the recess 34 were extended downstream.

As described, the pilot nozzle 50 is located on the downstream side of the lobe junction 25. This is a region of higher heat flow into the rotor housing 16 from the combustion process in each working chamber 28 than the region on the upstream side of said junction. Accordingly, location of the pilot nozzle 50 downstream of the lobe junction 25 has the further advantage in that the resulting higher temperatures help to more completely vaporize the pilot fuel in the cavity 51 for ignition by the spark plug 52. Such higher heat flow into the rotor housing is not a significant factor in the case of the main fuel nozzle 60 since this nozzle is not retracted any substantial distance away from the trochoid surface 24 into a recess as is pilot nozzle 50 so as to accommodate the pilot nozzle spark plug 52. Thus the main fuel nozzle 60 has its discharge end located relatively close to the trochoid surface 24. Also, the fuel discharged from the main fuel nozzle 60 is ignited by the burning of the pilot fuel rather than by a spark plug and therefore is more readily ignitable. Preferably, the nozzle 50 should have its discharge opening at the trochoid surface 24 located no more than about 15° downstream of the lobe junction 25 as measured about the axis of the shaft 22 in order that pilot fuel discharge into each working chamber 28 can be initiated at the desired time before said chamber reaches its top-dead-center position relative to the junction 25.

When an apex seal 30 of the rotor 18 is disposed at the common recess 51 for the pilot fuel nozzle 50 and spark plug 52, the pressure differential between engine working chambers 28 on opposite sides of said seal is substantially less than what it is when the seal is disposed on the other side of the lobe junction 25. Accordingly, location of the pilot nozzle 50 and spark plug 52 on the downstream side of the lobe junction has the further advantage of minimizing leakage around the apex seal when it passes under the recess 51 for said nozzle 50 and plug 52. The recess in the trochoid surface 24 for the main fuel nozzle 60 is much smaller than the recess 51 because the main nozzle 60 is disposed quite close to the trochoid surface and because it does not have the electrodes of a spark plug associated with it in the same recess. Hence, even though the main nozzle 60 is located on the upstream side of the lobe junction 25, the leakage around an apex seal as it passes under this nozzle is not as large as it would be if the pilot nozzle were located in this position.

The pilot fuel nozzle 50 preferably has only one orifice and, therefore, discharges its fuel in a single conical jet into each working chamber 28 as shown in FIGS. 1 and 2. The main fuel nozzle 60, however, preferably is a showerhead-type nozzle for not only spreading its fuel axially across each working chamber 28 but also for spreading fuel circumferentially across each working chamber 28, as shown in FIGS. 1 and 3. At least a major portion of the fuel from the main nozzle 60 is directed in a downstream direction to direct this fuel toward the burning fuel from the pilot nozzle and also to insure adequate fuel at the leading portion of each working chamber 28.

In order to assist in the atomization of the fuel discharged from the main nozzle 60, each trough-like recess 34 is disposed so that its upstream or trailing edge 34b closely approaches the main fuel nozzle 60 during fuel injection from this nozzle into a working chamber. Thus, as shown in FIG. 1, when the rotor 18 is in a top-dead-center position relative to the lobe junction 25 (that is, in the dot-and-dash line position shown), the trailing edge 34b of the recess 34 for the upper (as seen in FIG. 1) working chamber 28 is adjacent to the main fuel nozzle. This serves to constrict the area between the rotor working faces 33 and the rotor housing in the vicinity of the main fuel nozzle 60. Because of this constriction, the air flow past the fuel nozzle 60 resulting from rotor rotation is accelerated past the nozzle 60 thereby helping to atomize its fuel.

With the leading and trailing edges 34a and 34b of each recess 34 being located as described, the recesses 34 are disposed closer to the leading end of their rotor working faces 33 than to the trailing end of said faces.

The invention is not limited to the specific rotary engine configuration illustrated. For example, the intake port 42 could open through an inner wall of one of the end housings 12 or 14 instead of through the intermediate housing 16. Also, other types of fuel systems could be used for supplying fuel to the nozzles 50 and 60. Also, the trochoid surfce 24 could have more than two lobes with the number of rotor apex portions being correspondingly increased. It should be understood, therefore, that this invention is not limited to the specific details of construction and arrangement herein illustrated and that changes and modifications may occur to one skilled in the art without departing from the spirit or scope of the invention.

What is claimed is:

1. A rotary combustion engine comprising:
   (a) an outer body having an internal cavity, the inner peripheral surface of which has a multi-lobe profile such that the junctions of said lobes are disposed relatively close to the engine axis;
   (b) an inner body of generally polygonal profile having a plurality of apex portions mounted for relative rotation within said outer body cavity, the apex portions of said inner body having sealing cooperation with said multi-lobe peripheral surface to form a plurality of working chambers between the peripheral surfaces of said inner and outer bodies, which chambers vary in volume in response to said relative rotation;
   (c) said outer body having an air inlet port and an exhaust outlet port disposed adjacent to and on opposite sides of one of the junctions of the lobes of said multi-lobe peripheral surface;
   (d) a first fuel nozzle mounted on the outer body adjacent to and on the downstream side, relative to the direction of inner body rotation, of a second lobe junction of said multi-lobe peripheral surface adjacent to which combustion takes place and disposed to discharge its fuel through said surface in a generally upstream direction into each working chamber after the charge therein has been substantially compressed;
   (e) an igniter mounted on the outer body adjacent to said first fuel nozzle for igniting fuel discharging from said nozzle; and
   (f) a second fuel nozzle mounted on said outer body adjacent to and on the upstream side of said second lobe junction and disposed to discharge its fuel through said surface into each working chamber, also after the air charge therein has been substantially compressed, for ignition by the burning of the fuel discharged from said first nozzle, a major portion of the fuel discharging from said second nozzle being directed toward the leading portion of each working chamber.

2. A rotary combustion engine, as claimed in claim 1, in which the peripheral surface of the inner body has a plurality of working faces each extending between adjacent apex portions of said inner body with each working face having a trough-like recess therein disposed relatively close to the leading end of said working face.

3. A rotary combustion engine, as claimed in claim 2, in which the leading end of each said recess is sufficiently close to the leading end of its working face so that said first nozzle can be arranged so that the initial portion of its fuel discharge into a working chamber is directed toward said recess of the associated working face.

4. A rotary combustion engine, as claimed in claim 3, in which the leading portion of each said recess in each working face of the inner body constitutes a notch-like portion extending toward the leading end of said working face and toward which the initial portion of the fuel from the first nozzle is directed.

5. A rotary combustion engine, as claimed in claim 1, in which the trailing end of each working face recess is disposed close to the region of discharge of said second fuel nozzle when said working face is disposed close to its top-dead-center position.

6. A rotary combustion engine, as claimed in claim 1, in which said peripheral surface has two lobes and is basically an epitrochoid and said inner body has three apex portions and in which said first fuel nozzle is spaced downstream from said second lobe junction by no more than about 15° as measured about the axis of the epitrochoid surface.

7. A rotary combustion engine, as claimed in claim 6, in which the peripheral surface of the inner body has three working faces each extending between adjacent apex portions of said inner body with each working face having a trough-like recess therein disposed relatively close to the leading end of said working face and with the trailing end of said cavity being disposed close to the region of discharge of fuel from said second fuel nozzle when said working face is disposed close to its top-dead-center position.

* * * * *